United States Patent [19]

Holben

[11] Patent Number: 4,784,260

[45] Date of Patent: Nov. 15, 1988

[54] COMBINATION NOZZLE/OIL CONTAINER CARRIER

[76] Inventor: Clair D. Holben, 2741 S. Jay St., Denver, Colo. 80227

[21] Appl. No.: 174,109

[22] Filed: Mar. 28, 1988

[51] Int. Cl.$^4$ ............... B65D 81/36; B65D 83/00
[52] U.S. Cl. .............................. 206/223; 184/1.5; 206/150; 220/23.4; 222/475; 294/87.2
[58] Field of Search ............... 141/311 R, 343, 392; 184/1.5; 206/216, 223, 139, 145, 162, 150; 220/23.4; 222/132, 465.1, 475, 530, 538, 568

[56] References Cited

U.S. PATENT DOCUMENTS

| | | | |
|---|---|---|---|
| 1,617,992 | 2/1927 | Drake | 222/475 |
| 2,680,040 | 6/1954 | Gribskov et al. | 294/87.2 |
| 3,703,956 | 11/1972 | Oswalt | 206/223 |
| 3,897,872 | 8/1975 | Graser | 206/146 |
| 3,912,157 | 10/1975 | Graser | 229/40 |
| 4,098,398 | 7/1978 | Meyers | 206/223 |
| 4,402,401 | 9/1983 | Leno | 206/216 |
| 4,664,301 | 5/1987 | Hoyt | 222/538 |
| 4,706,719 | 11/1987 | Eversdijk | 206/216 |

*Primary Examiner*—Jimmy G. Foster
*Attorney, Agent, or Firm*—John E. Reilly

[57] ABSTRACT

An article carrier is specifically designed for carrying motor oil containers, the article carrier provided with loops which are releasably secured to the upper ends of the containers, webbing which interconnects the loops, and an elongated, generally tubular nozzle or spout extends intermediately between the containers and the loops to serve as a handle portion for the carrier; and the nozzle can be separated from the carrier and attached to the container for the purpose of pouring the contents of the container through a fill opening in the engine of the car. Modified forms of article carriers are included for supporting different numbers and types of containers as well as other accessories, such as, an oil filter as a part of an oil change kit.

12 Claims, 3 Drawing Sheets

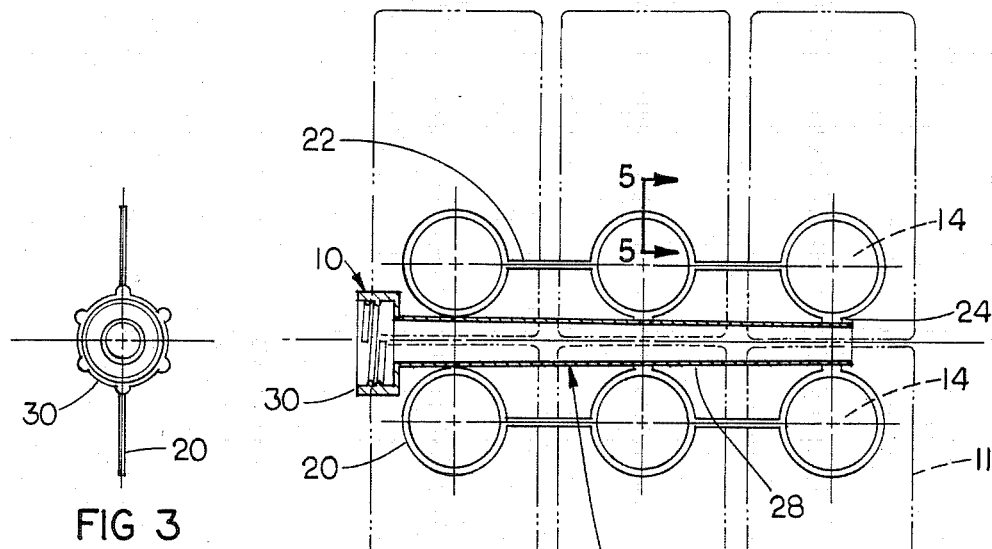
FIG 3
FIG 1
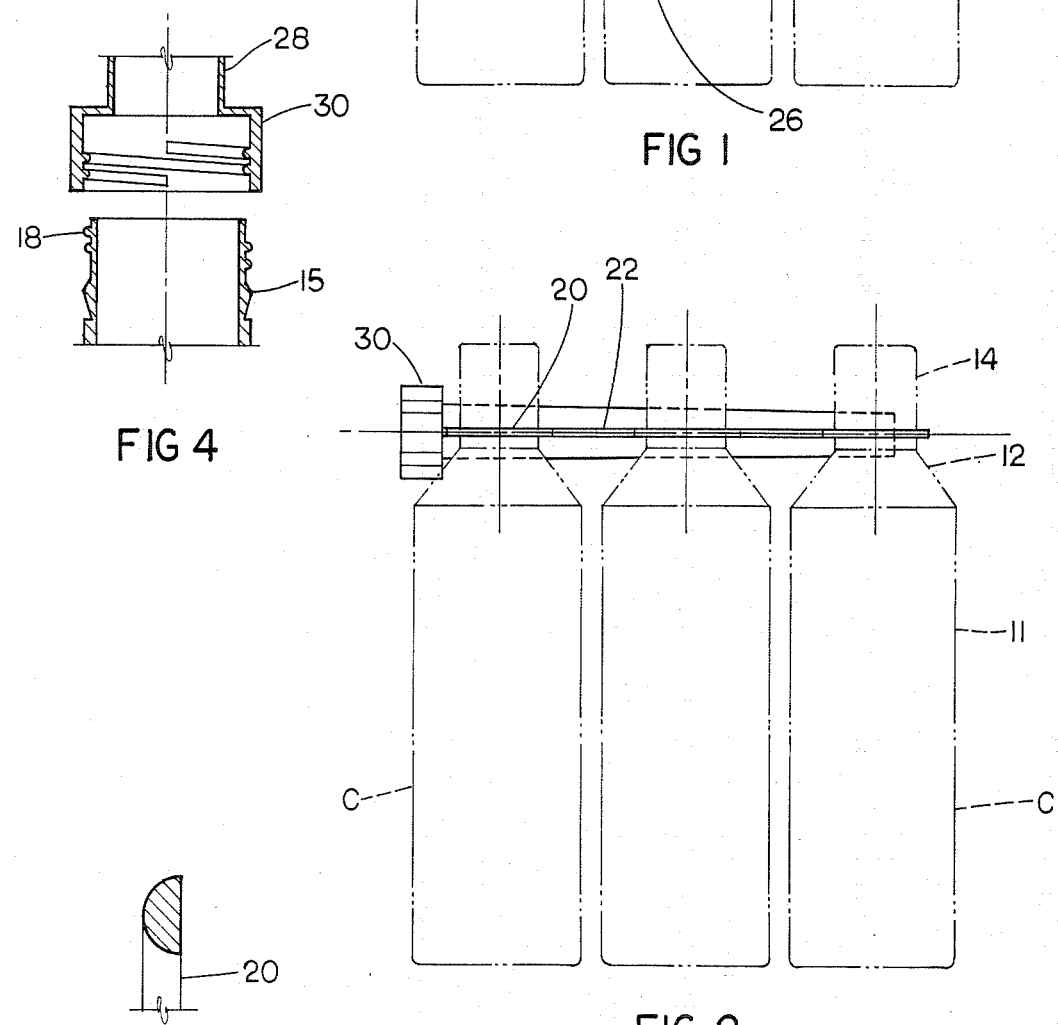
FIG 4
FIG 5
FIG 2

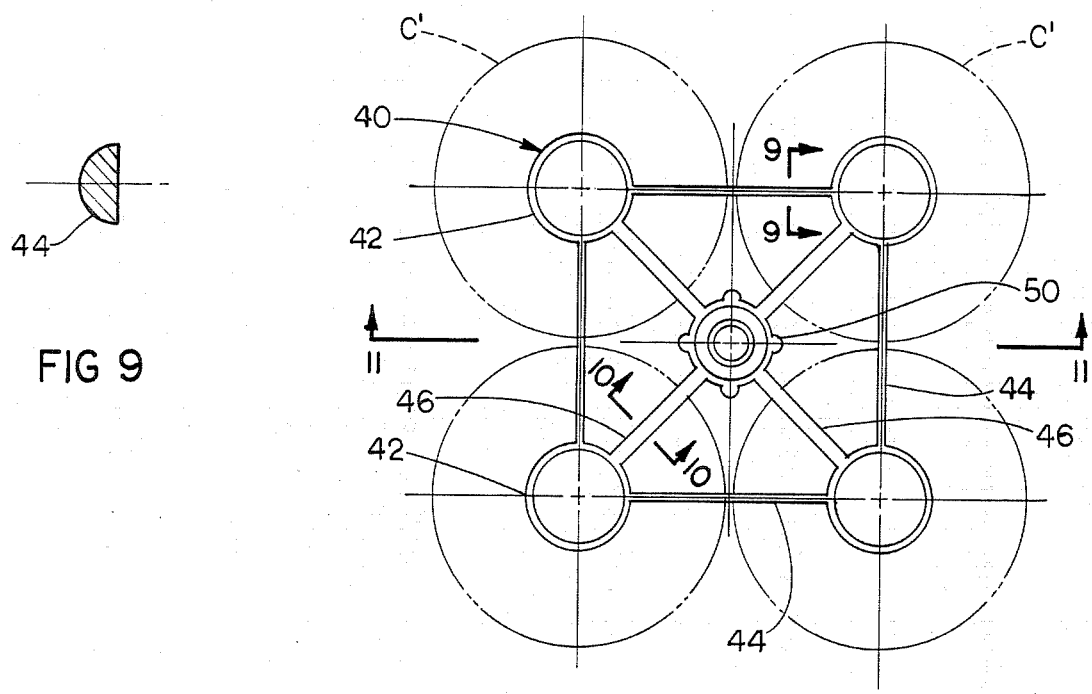
FIG 9
FIG 8
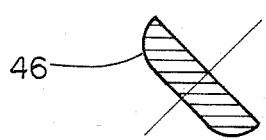
FIG 10
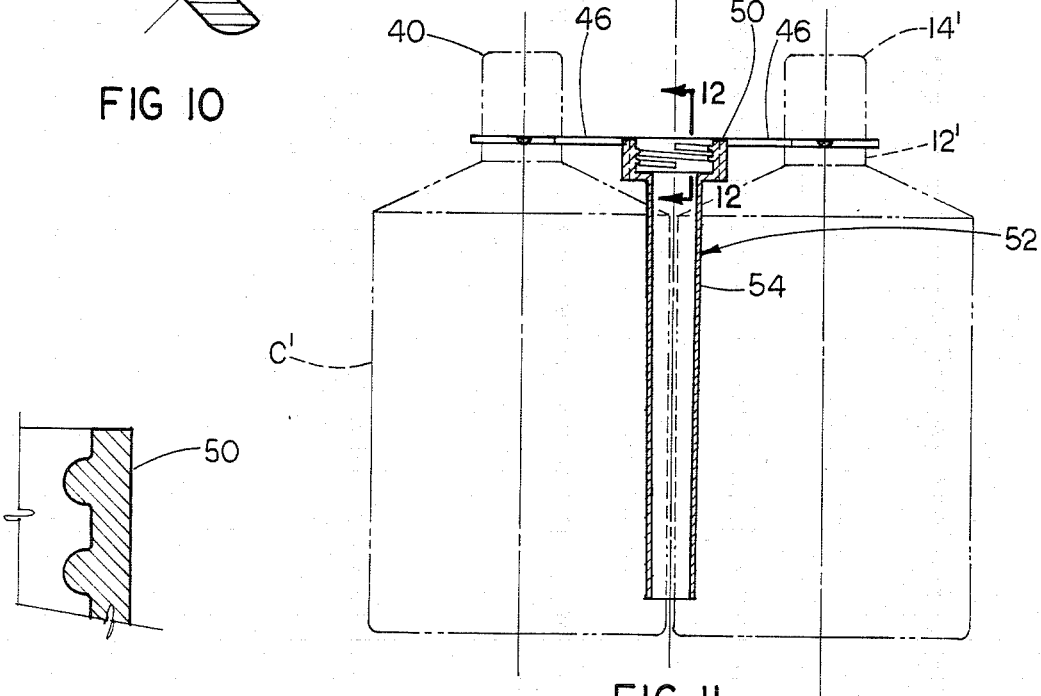
FIG 12
FIG 11

COMBINATION NOZZLE/OIL CONTAINER CARRIER

This invention relates to article carriers; and more particularly relates to a novel and improved container carrier of the "six-pack" variety and which is specifically adaptable for use as a holder and carrier for motor oil containers.

BACKGROUND AND FIELD OF THE INVENTION

In packaging articles, such as, beverage containers for sale for retail consumption, article carriers have been devised in the form of a blank or sheet provided with openings to receive the upper ends of the containers so as to retain the containers in side-by-side relation and provide a convenient handle or grasping portion between the containers. For instance, soda or oil cans have been packaged in a paperboard or plastic container blank which has a unitary handle to facilitate carrying of an entire package of several containers, such as, the well-known "six-pack".

Special considerations are involved in packaging motor oil containers. More and more, it is customary to employ containers with upper reduced ends or necks to form pour spouts and which are normally closed by screw cap ends. Notwithstanding their reduced ends, it is helpful to provide some form of a funnel or nozzle to facilitate emptying of the contents of the container into a fill opening in the engine of the car without spillage. For this reason, typical five-or six-pack container blanks or sheets are not readily adapted to retain a series of identical containers or corresponding size and shape together with different sized articles, such as, filters, funnels or nozzles. Nevertheless, it is desirable to provide a carrier which is readily conformable for use in packaging or combining into a single package different sized articles as described which can be conveniently carried in one hand and where the articles can be readily separated from the package when placed into use. Specifically, in utilizing as a carrier for motor oil containers it is a feature of this invention to integrate a nozzle or pour spout into the carrier itself and in such a way as to form a convenient handle grip for carrying of the articles and where the nozzle or spout can be readily separated from the carrier to use in combination with the oil containers, for example, in pouring the contents into a fill opening.

SUMMARY OF THE INVENTION

Accordingly, it is an object of the present invention to provide for a novel and improved article carrier which is conformable for carrying articles of the same or different size and shape.

It is another object of the present invention to provide for a novel and improved carrier for a plurality of motor oil containers in which a nozzle for the containers is incorporated into the carrier itself and serves as a convenient handle grip.

It is a further object of the present invention to provide for a novel and improved one-piece article carrier for articles of the same or different size and shape in which the carrier incorporates a handle grip support as well as to form one of the articles of the package.

It is still another object of the present invention to provide for a novel and improved package carrier of one-piece construction which is economical to manufacture, reliable and convenient to use and provides a firm support for a plurality of articles of the same or different size and shape.

In accordance with the present invention, an article carrier has been devised for small containers, such as, quart-sized motor oil containers of the type having upper correspondingly sized, reduced ends through which the contents of the container may be poured and which ends are normally closed by screw-on caps. The article carrier comprises releasable securing means releasably secured to the upper ends of the containers, and webbing extends between and interconnects the securing means with the containers arranged in juxtaposed rows with respect to one another; and an elongated, generally tubular dispensing means in the form of a nozzle or spout has means for interconnecting the nozzle to the securing means so that the nozzle is disposed intermediately between the rows of the containers and serves the purpose of a handle or gripping device to facilitate convenient carrying of a plurality of containers. The nozzle may extend either horizontally or vertically between rows of containers and is detachable from the webbing and securing means so as to permit its convenient use in pouring the contents from the container.

The securing means is preferably in the form of closed loops which will encircle the reduced ends of the container and specifically are sized to fit beneath the screw-on cap or protective rim directly beneath the threaded end of each container. The closed loops may be of the same or different size or diameter depending upon the size of the containers or other articles to be combined with the containers. Thus, in a modified form of invention, one of the loops or rings is enlarged to define a holder for an oil filter or funnel which together with the nozzle and motor oil containers will form an oil change kit which can be conveniently carried in one hand.

The above and other objects, advantages and features of the present invention will become more readily appreciated and understood from a consideration of the following detailed description of preferred and modified forms of the present invention when taken together with the accompanying drawings in which:

BRIEF DESCRIPTION OF THE DRAWINGS

FIG. 1 is a top plan view partially in section of a preferred form of article carrier illustrated in connected relation to a series of motor oil containers, in accordance with the present invention;

FIG. 2 is a front view in elevation further illustrating the preferred form of article carrier connected to a series of containers as illustrated in FIG. 1;

FIG. 3 is an end view of a preferred form of article carrier;

FIG. 4 is a cross-sectional view illustrating the use of the nozzle when separated from the carrier;

FIG. 5 is a cross-sectional view taken about lines 5—5 of FIG. 1;

FIG. 8 is a top plan view of still another modified form of article carrier shown in connected relation to a plurality of motor oil containers of circular cross-section;

FIG. 9 is a cross-sectional view taken about lines 9—9 of FIG. 8;

FIG. 10 is a cross-sectional view taken about lines 10—10 of FIG. 8;

FIG. 11 is a cross-sectional view taken about lines 11—11 of FIG. 8; and

FIG. 12 is a cross-sectional view taken about lines 12—12 of FIG. 11.

DETAILED DESCRIPTION OF THE PREFERRED EMBODIMENT

Figure 6:
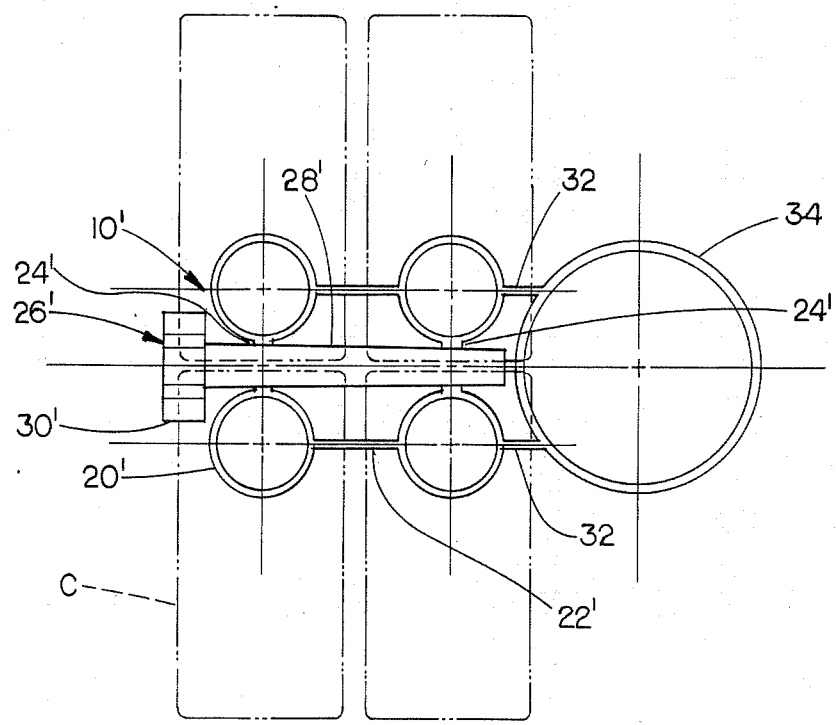
FIG. 6 is a top plan view of a modified form of article carrier specifically designed for use as an oil change kit.

There is shown by way of illustrative example in FIGS. 1 to 5 a preferred form of article carrier 10 in connected relation to a plurality of motor oil containers designated at C. By way of illustration and not limitation, the containers C are merely representative of various types of smaller sized liquid containers on the order of a quart size or less and specifically wherein each container C conventionally has a rectangular sectioned body 11, and an upwardly convergent neck 12 which terminates in an externally threaded end to permit threaded connection of a screw cap 14. Typically, a slight external enlargement or rim 15 is formed at the lower edge of the threaded end 18 of the container to assist in retaining the screw cap securely in place and to act somewhat as a reinforcing portion at that section of the container. As will become more readily apparent hereinafter, other configurations and types of containers may be packaged, such as, a round metallic or non-metallic container of uniform diameter or with a reduced end or neck 12.

The preferred form of carrier 10 of the present invention comprises securing means in the form of a closed loop or ring member 20 for each container C to be packaged or combined into the packaging assembly. Webbing in the form of interconnecting strips 22 extends intermediately between adjacent loops 20, and web-like limited projections 24 extend between each loop 20 and a common central handle portion in the form of nozzle 26. In the preferred form, the nozzle 26 includes a generally tapered spout or tube 28 converging away from an internally threaded socket end 30. The socket end 30 is dimensioned for threaded engagement with a threaded end portion 18 of each container, as illustrated in FIG. 4. The tubular portion 28 of the nozzle 26 is dimensioned such that it may be grasped by the user for convenience in lifting or carrying the container package, and its leading end is of a diameter such that it will fit into the oil fill openings on the engine of a car.

The article carrier as described is preferably composed of a synthetic plastic material, such as, an ethylene vinyl acetate sold under the Trademark No. 460 by the De Nemours Du Pont Corporation of Wilmington, Del. The entire carrier assembly including the nozzle 26 can be formed in a molding operation with the nozzle 26 being of slightly greater thickness than the loops 20 and webbing 22 and 24. The loops 20 are joined to diametrically opposed sides of the tube 28 by the projections 24, or are otherwise unitarily molded together at the large end of the nozzle without the necessity of projections 24. The loop members 20 and interconnecting webbing 22 may be of the same composition as the nozzle but of a slightly lesser thickness and be possessed of some flexibility and resilience to facilitate insertion of the end of each container through a loop and permit the loop to be spread slightly to be forced over the cap 14 on each container C. The loops 20 and webbing 22, 24 together are of sufficient strength to support the containers C when the nozzle is grasped and the entire package is carried with the containers freely suspended from the loops 20; and when the containers are picked up by the article carrier, the individual loops will flex into secure engagement with the upper neck ends of the containers beneath the caps 14 to prevent accidental loosening or dropping of the containers.

In use, when it is desired to remove a container C from the article carrier 10, one of the loops 20 is lifted or pried upwardly until it clears the cap 14 and can be slipped off. If all of the containers C are to be removed, the same steps may be repeated so that the entire article carrier is released from the containers. A screw cap 14 is then removed from one of the containers and the socket end 30 of the nozzle 26 can be threaded onto the upper threaded end of the container as illustrated in FIG. 4. If desired, the loops 20 and interconnecting webs 22 may be separated from the nozzle either by twisting off or by use of scissors or a knife to sever the projections 24 between the loops and tubular portion 28 of the nozzle. Of course, if it is desired to reuse the carrier or reassemble it onto the containers after pouring out the contents from one or more containers, the loops may be left intact with the nozzle so that they can be replaced into engagement with the upper ends of the containers.

DESCRIPTION OF MODIFIED FORMS OF THE PRESENT INVENTION

Figure 7:
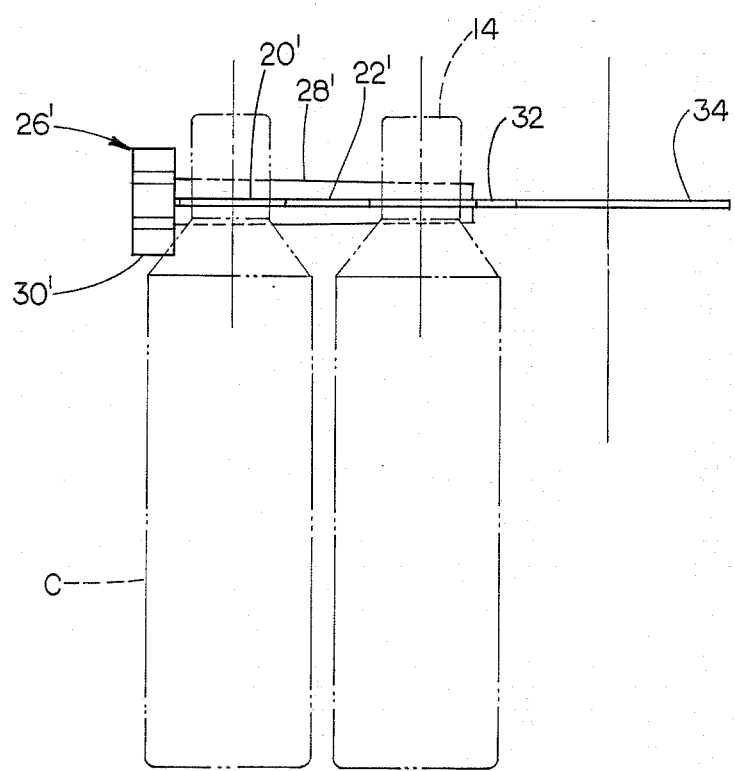
FIG. 7 is a front view in elevation of the modified form of assembly shown in FIG. 6.

A first alternate form of invention is illustrated in FIGS. 6 and 7 wherein like parts to those of FIGS. 1 to 5 are enumerated with prime numbers. In FIGS. 6 and 7, the securing means takes the form of four loop members 20' interconnected by webbing 22' and web-like projections 24' to a common nozzle 26' and specifically designed as a carrier for containers C. In addition, webbing 32 extends radially away from one end of the carrier 10' and specifically from connected relation to a pair of the loops 20' for connection to a larger loop 34. The webs 32 are connected at circumferentially spaced portions on the exterior surface of the loop 34 which is sized for insertion of an additional accessory, such as, an oil filter or funnel, not shown. Again, the loops 20' are joined to opposite sides of the tubular portion 28' of the nozzle by web-like projections 24', and the nozzle 30' once again serves as a convenient means of grasping the article carrier in lifting and carrying the containers as one unitary package.

Another modified form of invention is illustrated in FIGS. 8 to 12 wherein an article carrier 40 is designed for carrying a series of four generally cylindrical containers C'. Here, the article carrier 40 comprises four loops 42 of limited flexibility which are interconnected by intermediate webbing 44 extending between adjacent loops and inwardly projecting webs 46 which converge away from each of the loops toward a common center and are joined to upper socket end 50 of nozzle 52. The nozzle 52 is directed or extended vertically between the containers such that the tubular portion 54 depends downwardly into the central space between the four containers C'. In this form, the upper end of the nozzle 52 will serve as a means of grasping the article carrier centrally between the containers as well as to reinforce the webbing 46. It will be noted that the webbing 46 is of slightly greater cross-sectional size than the webbing 44 so as to lend additional strength to the inner webbing members 46 when grasped in the hand along with the upper socket end portion 50 of nozzle 52; yet the loop members 40 possess sufficient flexibility to facilitate their connection to the upper ends of the containers C' which as shown are provided with upper reduced end portions 12' with screw caps 14' corresponding to those of the preferred form of FIGS. 1 to 5.

In the modified forms of invention as described, the article carrier can be of one-piece molded construction, or the loops and interconnecting webbing can be molded in one piece and bonded or mechanically joined to the nozzle to form a unitary assembly.

The modified forms of article carriers may be removed from the containers in the same manner as described with respect to the preferred form of invention. Also, the loops 20 may be separated from the nozzle portion in the same manner, although in the case of the modified form of FIGS. 8 to 12 it is necessary merely to separate the inner ends of the webbing strips 46 from the upper socket end 50 of the nozzle 52. With reference both to the preferred and modified forms of invention as described, the dispensing member is illustrated as being in the form of a nozzle which can be attached to the upper end of a container and form an air-tight seal with the container so as to prevent overfilling when the nozzle is inserted into the fill opening. It will be readily appreciated, however, that the dispensing member may also take the form of a funnel with an elongated tapered tubular portion corresponding very much to that of the portions 28 and 54. Use of a funnel would be particularly desirable in an article carrier for rounded or cylindrical metal containers not having reduced ends and in which it is necessary to puncture the upper end of the container in order to pour the contents through the funnel into a fill opening as conventionally used in adding oil to a car.

It is therefore to be understood that various modifications and changes may be made in the specific construction and arrangement of preferred and modified forms of invention described as well as the precise composition of materials employed in construction of same without departing from the spirit and scope of the present invention as defined by the appended claims and reasonable equivalents thereof.

I claim:

1. In an article carrier for articles including a plurality of containers, said containers having upper correspondingly sized ends through which the contents of the container may be poured, said containers arranged in juxtaposed upstanding relation, the improvement comprising releasable securing means releasably secured to said upper ends of said containers, webbing betwen and interconnecting said securing means, and dispensing means in the form of an elongated generally tubular portion, and connecting means connecting said tubular portion to said securing means with said tubular portion extending between said containers.

2. In an article carrier according to claim 1, said tubular portion extending horizontally between said containers.

3. In an article carrier according to claim 1, said tubular portion including a container-engaging end, said tubular portion engageable as a hand gripping member when in connected relation to said securing means.

4. In an article carrier according to claim 1, said connecting means defined by web-like projections extending between each said securing means and said tubular portion.

5. In an article carrier according to claim 1, said securing means each being in the form of a resilient loop encircling the upper end of each container, and said dispensing means being a nozzle having a socket end portion and said tubular portion tapering away from said socket end portion.

6. In an article carrier according to claim 5, said containers having upper reduced ends and a cap on each upper reduced end, said loops being sized to pass over said caps into engagement with said upper ends of said container.

7. In an article carrier according to claim 5, said tubular portion extending vertically between said containers and said dispensing means including a socket end portion at one end of said tubular portion.

8. In an article carrier according to claim 7, said connecting means including elongated flexible webbing strips extending between each of said securing means and said socket end portion of said dispensing means with said tubular portion extending downwardly from said socket end portion intermediately between said containers.

9. In an article carrier according to claim 1, said containers arranged in a pair of juxtaposed rows with said tubular portion extending horizontally between said rows, said securing means each being in the form of a resilient loop member sized to closely encircle said upper end of each said container, and a supplementary loop member including connecting means between said supplementary loop member and said container loop members for insertion of an oil filter into said supplementary loop member.

10. In a carrier for motor oil containers wherein said containers have upper, correspondingly sized reduced ends through which the contents of each container may be poured and a removable cap normally closing each said upper reduced end, said containers arranged in upstanding, juxtaposed relation to one another, the improvement comprising a blank of synthetic plastic material including releasable securing means in the form of flexible loops, each loop sized for tight fitting engagement in surrounding relation to one of said upper reduced ends of said containers, webbing extending between said securing means, a dispensing member having an elongated, generally tubular portion and webbing extending between said resilient loops and said generally tubular portion with said tubular portion extending intermediately between said containers whereby said dispensing means is engageable as a hand gripping member when in connected relation to said webbing.

11. In an article carrier according to claim 10, said tubular portion extending horizontally between said upper reduced ends of said containers and said containers disposed in a pair of juxtaposed rows not exceeding three in each row.

12. In an article carrier according to claim 10, said tubular portion extending vertically through a space between said containers and including a socket end portion at an upper end of said tubular portion with said webbing connected to said socket end portion.

* * * * *